United States Patent [19]

Justice et al.

[11] 3,857,998

[45] Dec. 31, 1974

[54] AUDIO CODING SYSTEM FOR EDUCATIONAL TV

[75] Inventors: James W. H. Justice, Murrysville; Marcus H. Uhler, Pittsburgh, both of Pa.

[73] Assignee: Westinghouse Electric Corporation, Pittsburgh, Pa.

[22] Filed: May 25, 1973

[21] Appl. No.: 364,158

[52] U.S. Cl. .......................... 178/5.6, 178/DIG. 23

[51] Int. Cl. .......................................... H04n 7/08

[58] Field of Search .......... 178/DIG. 23, 5.6, 5.2 R, 178/5.8 R, 5.4 R; 179/15 BM

[56] References Cited

UNITED STATES PATENTS

| | | | |
|---|---|---|---|
| 2,671,130 | 3/1954 | Weighton et al. .................. | 178/5.6 |
| 2,875,271 | 2/1959 | Moore et al. ........................ | 178/5.2 |

*Primary Examiner*—Robert L. Griffin
*Assistant Examiner*—R. John Godfrey
*Attorney, Agent, or Firm*—M. P. Lynch

[57] ABSTRACT

A TV system wherein there is provided a method and apparatus for transmitting and receiving an audio signal for a multiplicity of audio channels along with multiple pictures on a video subcarrier. The transmitter is provided with two audio signals paths each having gates and audio signal samplers which are operated at a horizontal scan rate for the television picture field. A delay line in one audio signal path is used to delay the portion of the audio signal occurring during the vertical sync period for an interval of time greater than the vertical sync period of an amount equal to one-half of the period for each horizontal scanning line. The audio signal bursts from each signal path are added together and transmitted on a subcarrier in the same manner as video signals are modulated onto the subcarrier.

In the receiver, the audio signal bursts pass along two signal paths where gates and signal samplers in each signal path are operated at the horizontal scan rate to recover the signals by the use of detectors. The previously undelayed audio signal after detection, is delayed by a period of time corresponding to the vertical sync period plus one-half of the time period for each horizontal scan line whereby upon recombining the delayed and undelayed signals in the receiver, a continuous audio signal is recovered without a 60-cycle interruption that would otherwise occur if an audio signal was not present during the vertical sync period.

16 Claims, 7 Drawing Figures

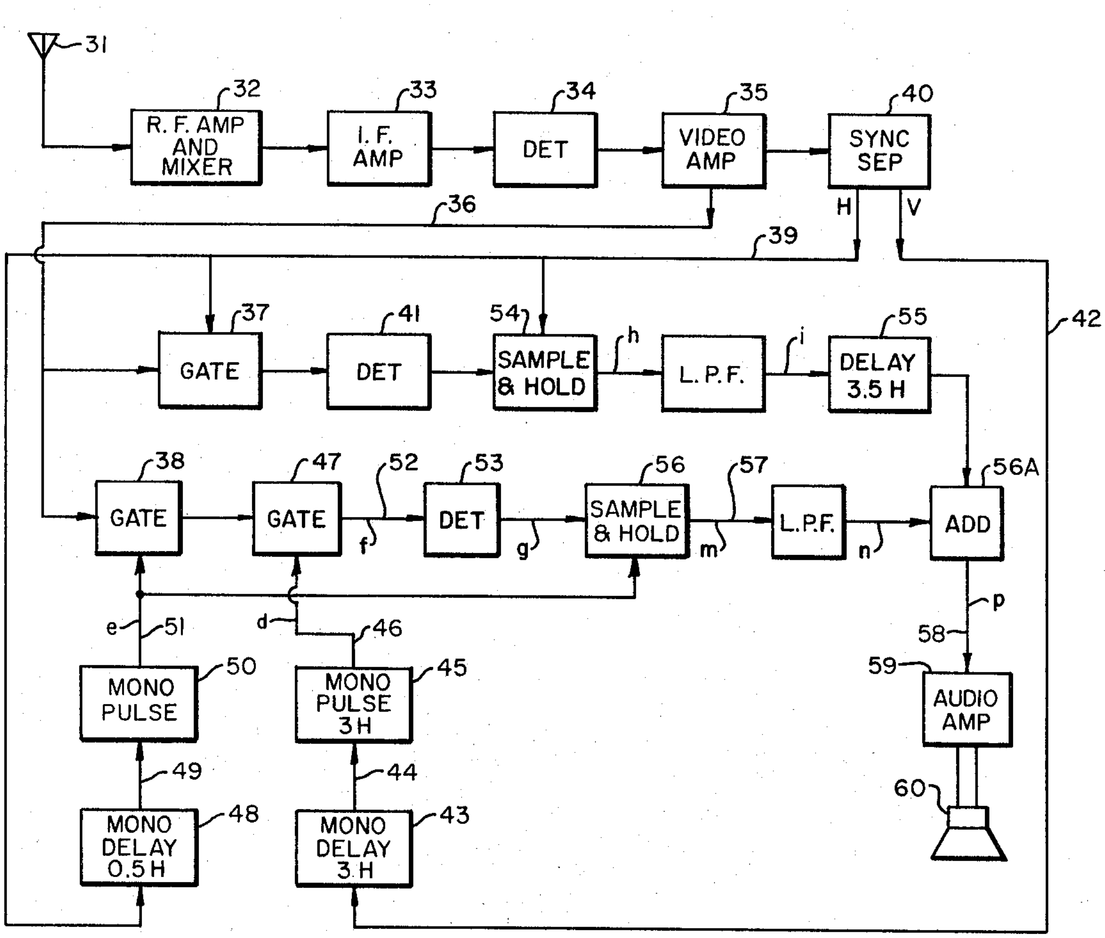
Fig. 6
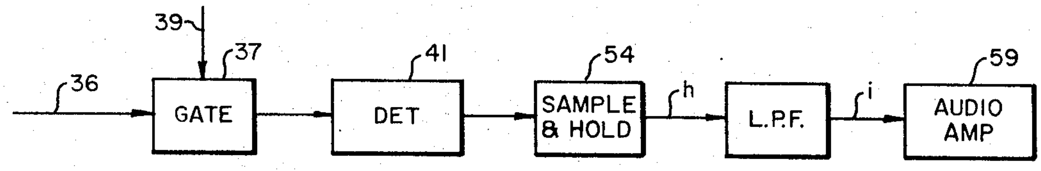
Fig. 8
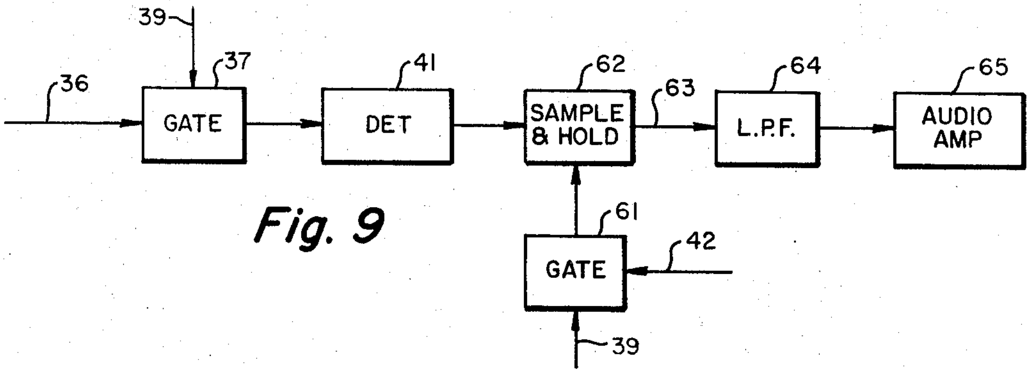

AUDIO CODING SYSTEM FOR EDUCATIONAL TV

BACKGROUND OF THE INVENTION

This invention relates to the concept of transmitting and receiving one or more audio and/or coding signals, herein referred to as an audio signal, by modulation onto the conventional subcarrier used for transmitting color video signals. The invention is particularly useful in educational television systems where a multiplicity of video signals are required along with a multiplicity of audio channels and/or coding channels. More particularly, the present invention relates to delaying the transmission of such an audio signal that normally occurs during the vertical sync period and, if desired, the entire vertical blanking period.

Picture and sound information are transmitted and received in conventional color television systems within a given frequency band by the use of different carriers. The sound carrier is located 4.5 megahertz higher in frequency than the picture carrier and the color subcarrier is 3.58 megahertz higher than the picture carrier. The sound carrier is frequency modulated with an audio signal, the color subcarrier is amplitude and phase modulated, and the picture carrier is amplitude modulated. Television systems, such as those that may be employed for educational purposes, have been developed for transmitting a multiplicity of video signals on a single television carrier frequency by using the principles used for the transmission of color video signals. Many of these systems featured the transmission of audio and/or coding signals along with the multiplicity of video signals for separate pictures.

One example of a television system featuring a multiplicity of pictures in the field of education is disclosed in copending application Ser. No. 364,163, filed May 25, 1973 and assigned to the Assignee of the present application. This system features a transmitter and receiver for a plurality of audio and coding signals along with multiple pictures. Bursts of audio signals are modulated in pairs onto the 3.6 megahertz quadrature phase subcarriers in the same way as conventional I and Q video signals are modulated onto the subcarrier. The bursts of audio signal pulses are produced during a blanked guard-band interval defined in the video signal during each horizontal scan line time period. The blanked guard-band interval may be located, if desired, immediately following the color reference burst in each horizontal scan line or, alternatively, the blanked guard-band interval is located midway in the interval during which luminance and chromance video signals are transmitted. In the television system, the blanked guard-band interval ultimately appeared on the face of the receiving tube as a vertical bar located along the left-hand side of the receiving tube in the first instance and located midway between the vertical edges of the picture tube in the second instance. The centrally located blanked guard-band interval was particularly useful in television systems wherein a different scene was provided for display in the four quadrants of the television receiving tube.

The transmission of audio signals in this manner takes place in addition to the conventional audio carrier frequency; and, therefore, produces a departure from the normally accepted waveforms particularly in view of the fact that during the vertical synchronizing interval, there is a continued transmission of audio signals representing a departure from today's standards for television systems.

To simply terminate the transmission of an audio signal during the vertical blanking period and particularly, the vertical sync period, is not an acceptable solution because it will result in a 60-cycle interruption of the audio information. This is because the picture is scanned at a rate of 60 fields per second and the vertical blanking occurs after the scanning of each field. The most undesirable location for bursts of audio signals in the video waveforms for television pictures are those occurring in the vertical blanking interval and particularly the occurrence of audio bursts during the transmission of vertical sync pulses.

SUMMARY OF THE INVENTION

In accordance with the present invention, an audio signal is transmitted in the form of audio signal samplings by using a conventional video subcarrier in a manner that the portion of the audio signal occurring during the vertical sync period is time delayed by some known amount such that signal samplings thereof occur during another part of the video waveform. In the receiver, recovery of the undelayed portion of an audio signal, includes the use of a delay line to provide a continuous signal by the combination with the transmitter delayed portion of an audio signal occurring during the vertical sync period.

More particularly, in accordance with the present invention, there is provided a method of transmitting a plurality of audio signals comprising the steps of, continuously sampling an audio signal at a predetermined rate including sampling the portion of the audio signal occurring during the vertical blanking interval between successive scannings of a television picture field, effecting a predetermined time delay to the audio samplings taken during at least the vertical sync period of the vertical blanking interval, combining the time delayed audio samplings with the audio samplings occurring after said vertical sync period, in a manner that a time delayed audio sampling occurs between subsequent audio samplings; and transmitting the combined audio samplings on a subcarrier conventionally used to transmit video signals on a single television carrier signal.

The present invention further provides in a television receiver, a method of recovering an audio signal from a subcarrier conventionally used for the transmission of color video signals, the audio signal being transmitted in the form of continuous sampling thereof at a known rate, the portion of the audio signal occurring during the vertical sync period between successive scanning of a television picture field being transmitted in the form of time delayed audio samplings occurring between subsequent samplings of the audio signal, the method comprising the steps of detecting the samplings of audio signals occurring at a known rate to provide a first portion of the audio signal occurring in time other than during the vertical sync period and a second portion of the audio signal time delayed from the vertical sync period, effecting a predetermined time delay to the first portion of the audio signal corresponding to the time delay of the second portion of the audio signal, combining the first portion of the audio signal after effecting a predetermined time delay with the second portion of the audio signal, and amplifying the combined portions of audio signals.

The present invention further provides an apparatus for transmitting an audio signal on a subcarrier in a manner conventionally used to transmit color video signals produced at a horizontal scan rate of a television picture field between the vertical blanking intervals, the apparatus comprising first means for producing samplings of the audio signal at a predetermined rate and at times other than during the vertical sync period of the vertical blanking interval, second means for producing samplings of the audio signal occurring during the vertical sync period at a predetermined rate, means for effecting a time delay to the samplings of the audio signal from the second means, the delay by the means for effecting a time delay being greater than the duration of the vertical sync period, and means for producing an audio sampling summation signal from the first means and the second means for producing samplings of the audio signal.

The present invention also provides an apparatus for receiving an audio signal transmitted on a subcarrier conventionally used for the transmission of color video signals on a single television carrier signal, the transmission of the audio signal being in the form of continuous sampling thereof at a known rate, the portion of the audio signal occurring during the vertical sync period between successive scanning of a television field being transmitted in the form of time delayed audio sampling occurring between subsequent sampling of the audio signal, the apparatus comprising first means for detecting the sampling of the audio signal at a known rate, second means for detecting a portion of the audio signal occurring during the vertical sync period between samplings of the audio signal at a known rate, delay means for effecting a time delay in the audio signal produced by first means for detecting an audio signal, means for producing a continuous audio signal by combining the delayed audio signal from the first means for detecting and the audio signal from the second means for detecting, and amplifier means for the continuous audio signal.

These features and advantages of the present invention as well as others will become more apparent when the following description is read in light of the accompanying drawings, in which.

Figures 1, 2, 3, 4:
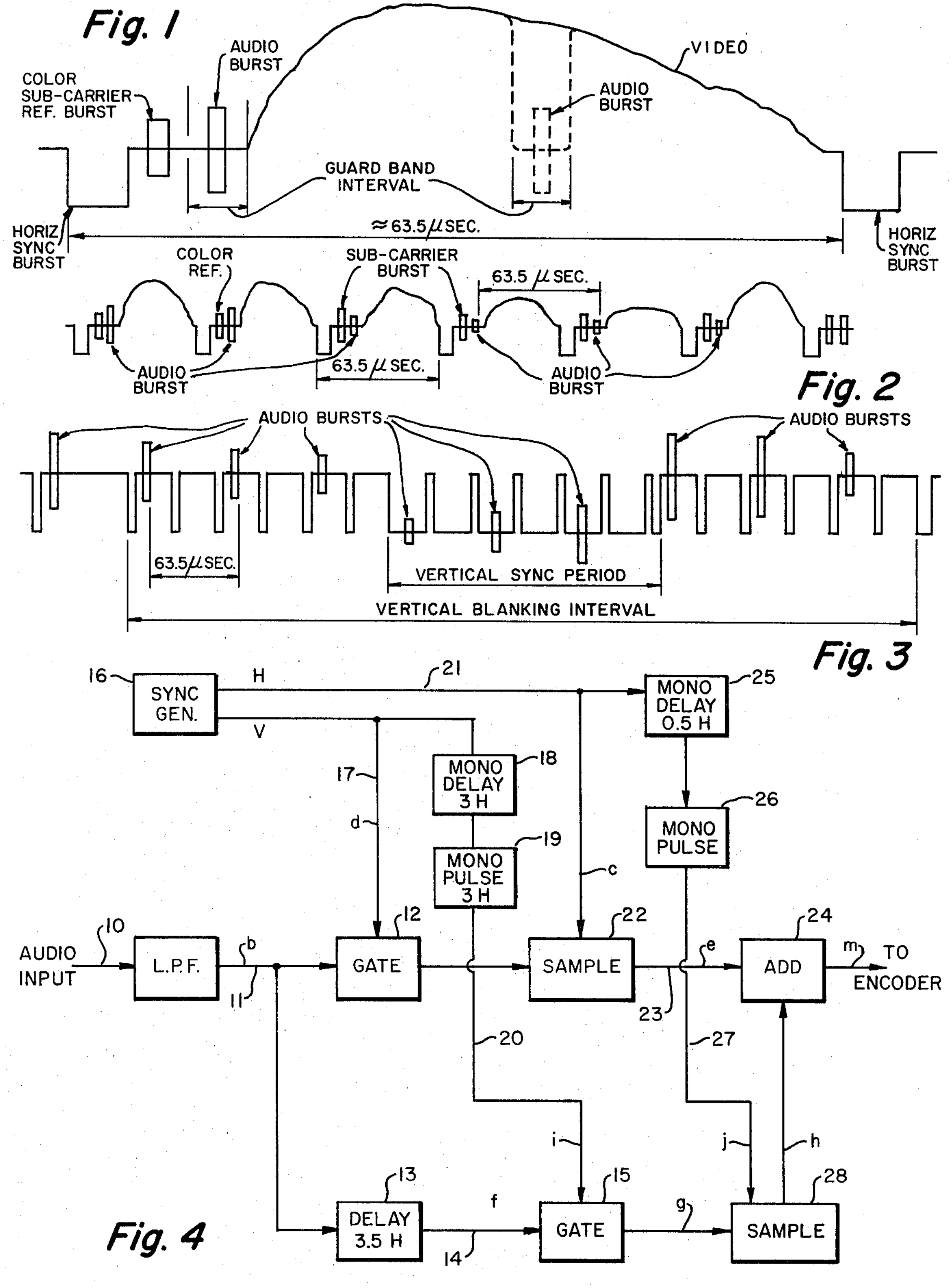
FIG. 1 is a typical waveform of the horizontal scanning of the picture field with the exception that there is included audio bursts in the video portion of the waveform.
FIG. 2 illustrates a plurality of the waveforms shown in FIG. 1 representing horizontal scanning of a picture field.
FIG. 3 is a waveform of the vertical blanking period during which audio signal bursts are transmitted.
FIG. 4 is a block diagram of circuitry for transmitting audio signals according to the features of the present invention.
Figure 7:
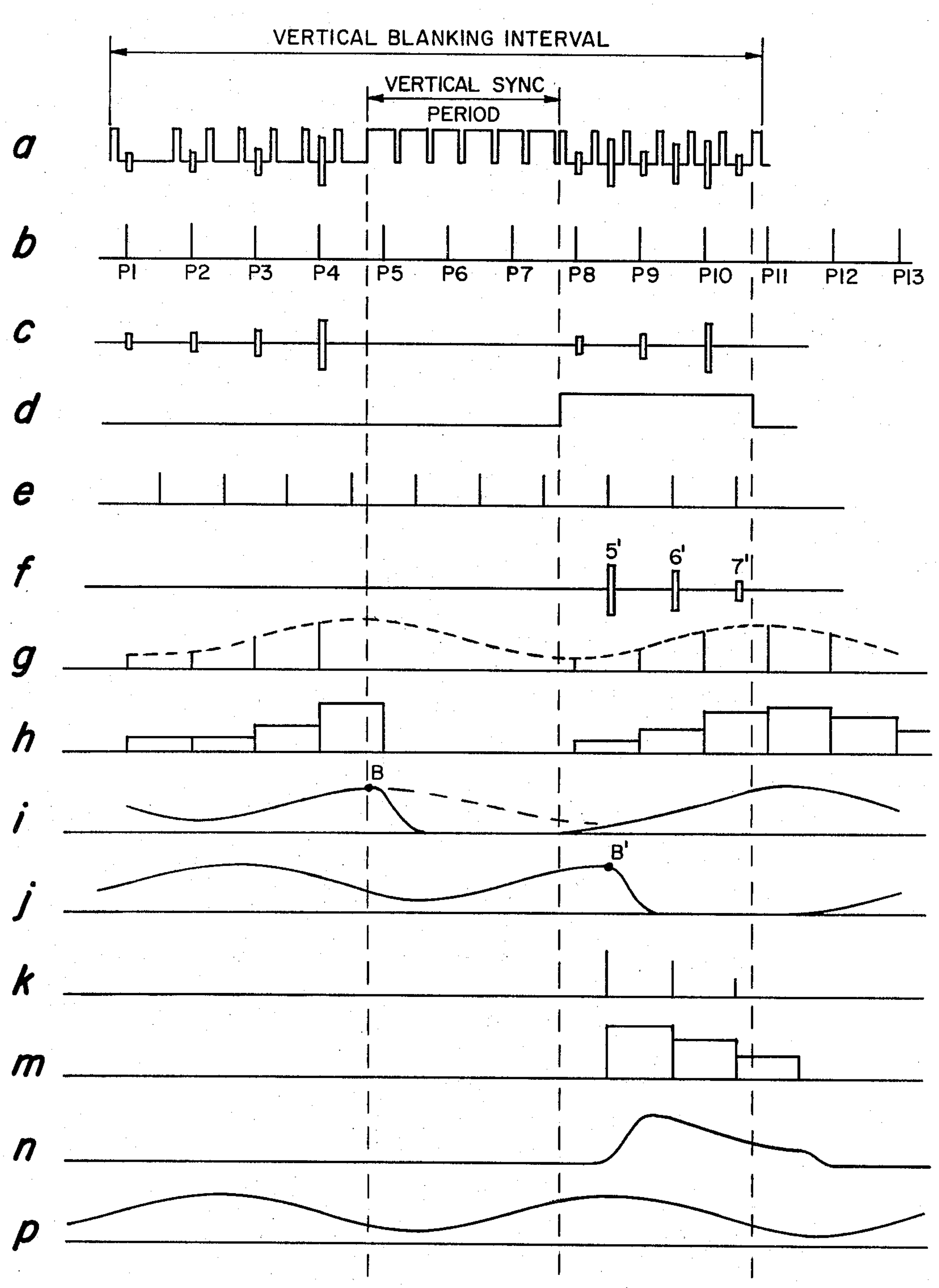

FIGS. 5*a* –5*m* comprise waveforms illustrating the operation of the circuitry shown in FIG. 4;

FIG. 6 is a block diagram of a portion of the audio section of a receiver for recovering an audio signal transmitted on a color video subcarrier according to the present invention;

FIGS. 7*a*–7*p* comprise waveforms illustrating the operation of the circuitry shown in FIG. 6;

FIG. 8 is a block diagram of a modified form of the circuitry shown in FIG. 6; and FIG. 9 is a second modified form of the receiver circuitry shown in FIG. 6.

With reference now to FIG. 1, the typical waveform illustrated thereby is produced during each horizontal line scanning a television picture. The time of each horizontal scanning is approximately 63.5$\mu$ seconds which corresponds to a horizontal scanning rate of 15,750 hertz, according to N.T.S.C. standards. The horizontal scan line typically includes a horizontal sync pulse followed by a color subcarrier reference burst which is, in turn, followed in the scan direction by the video waveform to the completion of the horizontal scan line. The present invention is concerned with the insertion of bursts of audio signals into the video waveform of each horizontal scan line which are shown located immediately following the color subcarrier reference burst within a blanked guard-band interval. The burst of audio signal may be located within a blanked guard-band interval located midway within the video waveform as specifically disclosed in copending application Ser. No. 364,163, filed May 25, 1973 and assigned to the Assignee of the present invention.

FIG. 2 illustrates a succession of horizontal scan lines which is intended to illustrate the succession of audio bursts inserted during each scan line at approximately 63.5$\mu$ second intervals. The scanning of the picture elements occurs by state-of-the-art cameras which operate according to U.S. standards wherein two fields are interlaced to provide a complete frame of video information. These cameras scan the odd lines of each of the fields during which lines 1, 3, 5–525 are scanned during slightly less than 1/60 of a second. Following this, a vertical blanking period occurs such as illustrated in FIG. 3. During this period, six equalizing pulses are produced which are followed by six vertical sync pulses of relatively wide duration and this is, in turn, followed by another six equalizing pulses after which regular horizontal pulses start the scanning of the even line numbers, that is, lines 2, 4, 6–524.

Figure 5:
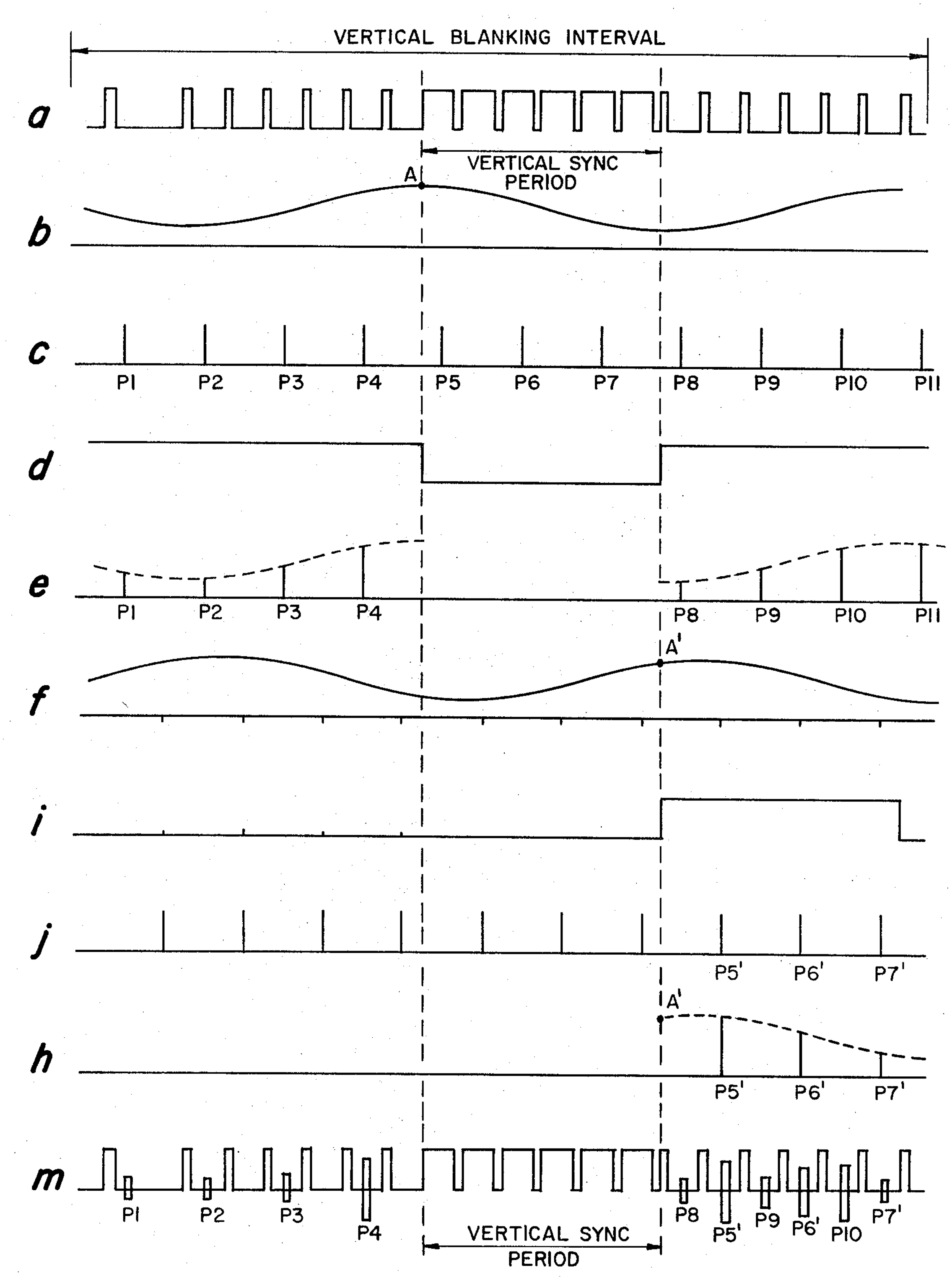

FIG. 3 is intended to illustrate the location of audio bursts at approximately 63.5$\mu$ second intervals and, as such, these audio bursts occur not only during the vertical sync period but also throughout the period during which the equalizing pulses are transmitted preceding and following the vertical sync period. In one aspect of the present invention, the bursts of audio signals are moved from the vertical sync period to another part of the video waveform by some known amount so that they can be recovered and phased in the correct position at the receiver. The respositioning of the audio bursts may be extended to include more or all such bursts occurring during the vertical blanking interval. The repositioning of these audio pulses is accomplished through the use of the circuitry illustrated in FIG. 4 and the waveforms accompanying the operation of this circuit are illustrated in FIGS. 5*a*–5*m*. An audio input signal which may be a composite of a plurality of audio channels, is delivered by line 10 to a low-pass filter at 7.8 kilohertz, for example, where the audio signal in line 11 is represented by the waveform shown in FIG. 5*b*. This waveform, for the purpose of this description, may be associated with a reference point A occurring at the start of the vertical sync period of the vertical blanking interval shown by the waveform of FIG. 5*a*. The audio signal in line 11 follows two signal paths whereby it is applied to a gate 12 and to a delay line 13. The delay line 13 is selected at a value such as, for example, 3.5 times the horizontal scan line period whereby the audio signal from the delay line appearing in line 14 undergoes a time delay of three horizontal line periods and a 0.5 horizontal line period phase displacement, illustrated by FIG. 5*f*, wherein the point of reference A' is seen to occur 3.5 horizontal scan lines later than the point A shown in FIG. 5*b*. The signal in line 14 is applied to a gate 15. The gate 12 is rendered non-conductive in response to a vertical sync pulse, as shown by FIG. 5*d* from a sync generator 16. The vertical sync pulse is applied by line 17 to a monostable multivibrator delay 18 having a pulse delay output equal to the time period of the vertical sync period. The delayed pulse from the monostable multivibrator 18 is received by a monostable multivibrator 19 that delivers a pulse for a period of time equal to three horizontal scan periods which corresponds to the duration of the vertical sync period. The signal from the monostable multivibrator 19 has a waveform illustrated in FIG. 5*i* and it is delivered by line 20 to the gate 15 rendering it conductive after the vertical sync period.

The sync generator 16 also produces horizontal sync pulses in line 21 at the horizontal scanning rate of 15,750 hertz, for example, which is shown in FIG. 5*c*, as consecutively numbered horizontal sync pulses P1, P2, P3....P11. The pulses in line 21 operate a sampler 22 for sampling the audio signal from gate 12 which appear in line 23 as illustrated by FIG. 5*e*. In this regard, it will be noted that after sampling the audio signals using horizontal sync pulses P1, P2, P3 and P4, the gate 12 is rendered nonconductive during the vertical sync period following which the gate is again rendered conductive and audio sampling occurs using pulses P8, P9, P10, P11, etc. The sampling of the audio signal in line 23 is delivered to an add circuit 24.

The horizontal sync pulses in line 21 are also delivered to a monostable multivibrator 25 which produces an output pulse having a delay corresponding to 0.5 hoirzontal scan line time periods. These pulses are received by a monostable multivibrator 26 which produces pulses in line 27 that are represented by the waveform shown in FIG. 5*j*. An audio sampler 28 is controlled in response to the delayed horizontal sync pulses in line 27 for sampling the portion of the audio signal delivered to it through the gate 15, after a 3.5 horizontal line time period delay. The output signal from the sampler 28 corresponds to a waveform shown by FIG. 5*h* wherein it will be observed that this portion of the audio signal is sampled by time delayed horizontal sync pulses P5', P6' and P7'. The signal from the sampler 28 is connected to the add circuit 24 where it is combined with the signal from the sampler 22 to produce a combined audio signal for delivery to an encoder. After processing and combining with the picture and synchronizing information, this results in a waveform illustrated by FIG. 5*m* wherein it will be observed that bursts of audio signals occur at pulse positions P1, P2, P3 and P4 between the equalizing pulses of the vertical blanking period. The vertical sync period is void of all audio signal bursts in which regard the audio signal burst pulse positions P5', P6' and P7' which would have normally occurred during the vertical sync period, are now time delayed and inserted 3.5 horizontal line periods later where these audio signal bursts are interlaced between audio signal bursts from pulses P8, P9, P10, etc. occurring during the equalizing pulses produced after the vertical sync period. The audio signal bursts are delivered to an encoder where they are modulated onto a subcarrier and transmitted on a single television carrier signal using techniques such as employed in the aforementioned U.S. Ser. No. 364,163.

With reference now to FIGS. 6 and 7*a*–7*m*, a receiver is provided for the recovery of the audio signals transmitted according to the foregoing description and FIG. 4. The TV carrier signal is received by an antenna 31 which is applied to a radio-frequency amplifier and mixer 32 whose output is connected to an intermediate frequency amplifier 33 whose output is delivered to a video detector 34. The video signal from detector 34 is delivered to a video amplifier 35 which provides an output signal in line 36 including a modulated subcarrier with bursts of an audio signal. Line 36 has a waveform shown by FIG. 7*a* during the vertical blanking interval. This waveform corresponds to the waveform illustrated in FIG. 5*m* previously described. The signal in line 36 is branched into two signal paths and delivered to a gate 37 and a gate 38. The gate 37 is rendered conductive in response to horizontal sync pulses produced in line 39 from a sync generator circuit 40 that, in turn, receives a signal from the video amplifier 35. The signal in line 39 is shown by the waveform of FIG. 7*b* wherein it will be observed that the gate 37 is rendered conductive at regular intervals corresponding in time to the horizontal sync pulses P1, P2...P13, etc. for the recovery of audio bursts occurring as shown in FIG. 7*c* which are delivered to a detector 41.

The sync separator 40 produces vertical sync pulses in line 42 connected to a monostable multivibrator 43 that produces a pulse in line 44 after a delay of a time period corresponding to 3.0 horizontal scan line time periods. The signal in line 44 is connected to a monostable multivibrator 45 that produces a pulse in line 46 having a waveform illustrated in FIG. 7*d* which occurs for a duration of time corresponding to the vertical sync period. Thus, it will be appreciated that the vertical pulse signal in line 42, after a delay of 3.0 horizontal scan periods, appears as a signal pulse having a duration of three horizontal scan periods which is used to control a gate 47. The bursts of audio signal delivered to this gate occur when the gate 38 is rendered conductive which takes place by providing the horizontal sync pulse in line 39 to a monostable multivibrator 48 that produces a time delay pulse in line 49 corresponding to a delay of 0.5 horizontal scan line time periods. The pulse in line 49 is received by a monostable multivibrator 50 which produces a waveform in line 51 corresponding to FIG. 7*e*. This waveform is characterized by horizontal sync pulses occurring at a time displacement of 0.5 horizontal scan line time periods from that of the horizontal sync pulses in line 39, (FIG. 7*b*). FIG. 7*f* illustrates the audio bursts during pulses P5', P6' and P7' in line 52 from the gate 47. Thus, it can be readily seen that the gates 38 and 47 are operated in such a manner that the only audio signal bursts present in line 52 are those identified in FIG. 7*f* as 5', 6' and 7' delivered to a detector 53.

The detector 41 provides an output signal represented in FIG. 7*g* which is delivered to a sample and hold circuitry 54 controlled in response to a horizontal sync pulse in line 39 to produce an output signal illustrated in FIG. 7*h*. Thus, it will be observed that the sample and hold circuitry, upon receiving the first pulse, produces a signal having a duration that lasts until a second or different pulse amplitude is sampled which then occurs as an output until a third or different signal is received and so forth. The signal from the sample and hold circuitry is then limited by a low-pass filter which produces an output represented by the waveform of FIG. 7*i*. The waveform illustrated in FIG. 7*i* is then connected to a delay line 55 which produces a delay in the audio signal according to the waveform shown in FIG. 7*j* corresponding to 3.5 horizontal scan line time periods. This is shown by the shift in position of a reference point B in FIG. 7*i* to the position B' shown in FIG. 7*j*. The waveform *j* which corresponds to a portion of an audio signal is delivered to an add circuit 56A.

Returning now to the detector 53, the output signal therefrom is represented by the signal bursts in FIG. 7*k* wherein audio signal bursts are shown in their time delayed positions P5', P6' and P7' corresponding to 3.5 horizontal scan line periods from the position they had originally assumed in the vertical sync period prior to entry into the transmitter circuit previously described in regard to FIG. 4. The audio pulses are then delivered to a sample and hold circuitry 56 controlled in response to the delayed horizontal sync pulse in line 51 (waveform shown in FIG. 7*e*) to produce an output signal in line 57 corresponding to the waveform shown in FIG. 7*m* which, after passing through a low-pass filter, occurs as a waveform shown in FIG. 7*n*. The signal represented by the waveform *n* is connected to the add circuit 56A where it is combined with a waveform shown in FIG. 7*i* to produce a continuous audio signal shown by the waveform in FIG. 7*p* in line 58 which, after passing through an amplifier 59, is used to drive a loudspeaker 60. It will be observed that the waveform P occurs as substantially the same waveform as that represented in FIG. 5*b* at the transmitter prior to the gating and delaying operations. The total delay to the audio signal relative to the picture information is approximately 220 microseconds. This delay is of such a short interval of time such that no effect on the visible timing of the sound and vision will occur as a result thereof. In the event the delaying and adding processes occurring in the receiver as just outlined are not used, a 60-cycle interruption will occcur in the audio output. The 60-cycle interruption contains several harmonics of 60 cycles and gives rise to certain coloration of the audio output. The effect, however, is small and less noticeable when some audio frequencies are being reproduced than others. For example, it may be hardly noticeable at all on speech. A more simplified form of receiver circuitry for audio signals transmitted according to FIG. 4 is shown in FIG. 8 and a modification thereto is shown in FIG. 9.

With reference first to FIG. 8, there is illustrated a portion of the same circuitry previously illustrated and described in regard to FIG. 6. In this regard, the signal in line 36 from the video amplifier is connected to the gate 37 which is rendered conductive in response to the horizontal pulses in line 39. The signal from gate 37 is processed in the manner already described to the point where there is produced an output signal having a waveform illustrated in FIG. 7*i* which is delivered from the low-pass filter. This waveform may then be used directly as an input to an audio amplifier 59. By this arrangement, only the audio signal bursts 1, 2, 3, 4, 8, 9 and etc. are recovered at the receiver and the time delayed and phase displaced pulses 5, 6 and 7 are abandoned to recovery.

A compromise arrangement to that shown in FIG. 8 is illustrated in FIG. 9 in regard to which the same circuitry is used with the exception that a gate 61 is rendered conductive in response to the horizontal sync pulses occurring in line 39 and, in addition thereto, the gate is rendered nonconductive in response to the vertical pulse signal in line 42. The output from the gate 61 is connected to the sample and hold circuit 62 which produces an audio signal in line 63 which, after passing through a low-pass filter 64, is connected to an audio amplifier 65. The operation of the circuit illustrated in FIG. 9 has a feature that the last sampled audio level before the vertical sync period is held until the next sampled audio level occurs following the vertical sync period. This has the desirable effect of producing a reduction in the 60-cycle interruption that would otherwise occur. By using this method, audio frequencies below approximately 1.25 thousand cycles per second are almost completely free from noticeable interruption and frequencies above approximately 2.5 thousand cycles per second are not significantly different from those occurring without the added gating provided by the vertical signal in line 42.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In a television transmitter, a method of transmitting an audio signal on a subcarrier conventionally used to transmit color video signals, said audio signal being continuously processed for transmission including during the vertical blanking interval between scanning of successive television picture fields, said method comprising the steps of:

continuously sampling an audio signal at a predetermined rate including sampling during the vertical blanking interval between successive scannings of a television picture field;

effecting a predetermined time delay to the audio samplings taken during at least the vertical sync period of only the vertical blanking interval;

combining the time delayed audio samplings with the audio samplings occurring after said vertical sync period, in a manner that a time delayed audio sampling occurs between subsequent audio samplings;

generating a blanked guard-band interval in the video signal produced during successive horizontal scan lines of a picture field for an interval of time apart from occurring horizontal sync pulses; and transmitting the audio samplings including the time delayed audio samplings combined therewith during generated blanked guard-band intervals by modulation onto a subcarrier used to transmit color video signals on a single television carrier signal.

2. The method according to claim 1 comprising the additional steps of:

dividing said audio signal into two signal paths before said continuously sampling thereof; and said effecting a predetermined time delay occurring in one of said two signal paths before continuously sampling of the audio signal.

3. The method according to claim 2 wherein said predetermined time delay corresponds to an interval of time equal to approximately three and one-half horizontal scan line time periods.

4. The method according to claim 3 wherein said continuously sampling an audio signal occurs at a rate corresponding to the horizontal scan rate of the field for the television picture.

5. The method according to claim 4 wherein said audio samplings are taken in a manner to produce audio signal bursts which are transmitted by modulation onto said subcarrier in the same manner as color video signals are modulated onto a subcarrier.

6. In a television receiver, a method of recovering an audio signal from a subcarrier conventionally used for the transmission of color video signals, said audio signal being transmitted in the form of continuous sampling thereof at a known rate, the portion of said audio signal occurring during the vertical sync period between successive scanning of a television picture field being transmitted in the form of time delayed audio samplings occurring between subsequent samplings of the audio signal, said method comprising the steps of:

detecting said samplings of audio signals occurring at said known rate to provide a first portion of said audio signal occurring in time other than during said vertical sync period and a second portion of said audio signal time delayed from said vertical sync period, effecting a predetermined time delay to said first portion of said audio signal corresponding to the time delay of said second portion of said audio signal, combining said first portion of said audio signal after effecting said predetermined time delay with said second portion of said audio signal; and amplifying said combined portions of audio signals.

7. The method according to claim 6 comprising the additional steps of:

dividing said samplings of the audio signal into two signal paths before said detecting of said samplings of audio signal; and said effecting a predetermined time delay to said first portion of said audio signal occurring in one of said two signal paths after said detecting of said samplings of the audio signal.

8. The method according to claim 7 wherein said effecting a predetermined time delay produces a delay of an interval of time equal to approximately three and one-half horizontal scan line time periods of said television picture field.

9. The method according to claim 8 wherein said detecting samplings of the audio signal occurs at a known rate corresponding to the horizontal scan rate of said television picture field.

10. An apparatus for transmitting an audio signal on a subcarrier in a manner conventionally used to transmit color video signals produced at a horizontal scan rate of a television picture field between vertical blanking intervals, said apparatus comprising:

first means for producing samplings of said audio signal at a predetermined rate and at times other than during the vertical sync period of said vertical blanking interval;

second means for producing samplings of said audio signal occurring during said vertical sync period at said predetermined rate;

means for effecting a time delay to the samplings of the audio signal from said second means;

the delay by said means for effecting a time delay being greater than the duration of said vertical sync period; and means for producing an audio sampling summation signal from said first means and said second means for producing samplings of the audio signal.

11. An apparatus for transmitting an audio signal according to claim 10 wherein said first means for producing samplings of said audio signal include:

gate means rendered conductive to said audio signal at times other than the vertical sync period of said vertical blanking interval;

sampler means receiving the audio signal from said gate means for producing bursts of the audio signal; and sync generator means for providing pulses to control said gate means and said sampler means.

12. An apparatus for transmitting an audio signal according to claim 11 wherein said second means for producing samplings of said audio signal during said vertical sync period include gate means rendered conductive to the audio signal from said means for effecting a time delay, and sampler means receiving the delayed audio signal from said gate means for producing bursts of the audio signal in response to control pulses from said sync generator.

13. An apparatus for transmitting an audio signal according to claim 12 wherein said sync generator produces horizontal and vertical sync pulses for controlling the scanning of a television picture field, said apparatus comprising, first monostable multivibrator means for producing time delayed vertical sync pulses corresponding to the duration of said vertical sync period, said first monostable multivibrator means rendering conductive said gate means for the delayed audio signal, and second monostable multivibrator means for producing time delay to said horizontal sync pulses by a period of time less than the time between horizontal sync pulses for operating said sampler means receiving the delayed audio signal.

14. An apparatus for receiving an audio signal transmitted on a subcarrier conventionally used for the transmission of color video signals on a single television carrier signal, the transmission of said audio signal being in the form of continuous sampling thereof at a known rate, the portion of the audio signal occurring during the vertical sync period between successive scanning of a television field being transmitted in the form of time delayed audio sampling occurring between subsequent sampling of said audio signal, said apparatus comprising:

first means for detecting the sampling of said audio signal at said known rate, second means for detecting a portion of said audio signal occurring during the vertical sync period between sampling of the audio signal at said known rate;

delay means for effecting a time delay in the audio signal produced by said first means for detecting an audio signal;

means for producing a continuous audio signal by combining the delayed audio signal from said first means for detecting and the audio signal from said second means for detecting; and amplifier means for the continuous audio signal.

15. An apparatus for receiving an audio signal according to claim 14 further comprising:

sync generator means for providing horizontal sync pulses and vertical sync pulses conventionally used to control the scanning of a television field;

first gate means rendered conductive to samplings of said audio signal by said horizontal sync pulses for delivery of audio signal samplings to said first means for detecting;

first sample and hold means controlled in response to said horizontal sync pulses for producing a first portion of an audio signal out of audio samplings delivered from said first means for detecting;

second gate means rendered conductive to said time delayed audio samplings in response to said horizontal sync pulses;

third gate means rendered conductive to said time delayed audio samplings in response to said vertical sync pulse for delivering said time delayed audio samplings from said second gate means to said second means for detecting; and second sample and hold means operative in response to said horizontal sync pulses for producing a second portion of an audio signal out of said time delayed audio samplings.

16. An apparatus for receiving an audio signal according to claim 15 further comprising:

first monostable multivibrator means for time delaying said horizontal sync pulses by an amount less than the time between horizontal sync pulses for controlling said second gate means and said second sample and hole means; and second monostable multivibrator means for time delaying said vertical sync pulses by an amount greater than the duration of said vertical sync period for rendering conductive said third gate means.

* * * * *